No. 656,032. Patented Aug. 14, 1900.
J. F. MEREDITH.
BAKING PAN.
(Application filed Dec. 9, 1899.)
(No Model.)

Witnesses
John Maupin

Inventor
J. F. Meredith
By his Attorneys, C. A. Snow & Co.

THE NORRIS PETERS CO., PHOTO-LITHO., WASHINGTON, D. C.

UNITED STATES PATENT OFFICE.

JACOB F. MEREDITH, OF NEWARK, OHIO.

BAKING-PAN.

SPECIFICATION forming part of Letters Patent No. 656,032, dated August 14, 1900.

Application filed December 9, 1899. Serial No. 739,840. (No model.)

*To all whom it may concern:*

Be it known that I, JACOB F. MEREDITH, a citizen of the United States, residing at Newark, in the county of Licking and State of Ohio, have invented a new and useful Baking-Pan, of which the following is a specification.

This invention relates to baking-pans, and has for its object to provide an improved pan especially designed for baking a plurality of loaves of bread in a single pan at one and the same time, so as to facilitate the handling of the bread, and also to provide a strong and durable pan which will not become warped or misshapen by the action of the heat or by constant handling.

To these ends the present invention consists in the combination and arrangement of parts, as will be hereinafter more fully described, shown in the accompanying drawings, and particularly pointed out in the appended claim, it being understood that changes in the form, proportion, size, and minor details may be made within the scope of the appended claim without departing from the spirit or sacrificing any of the advantages of the invention.

Figure 1:
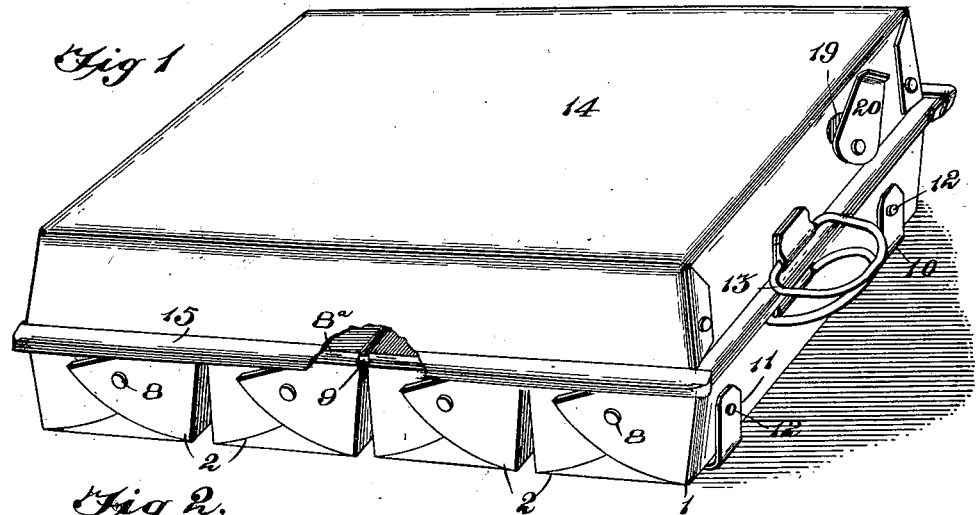
Figure 2:
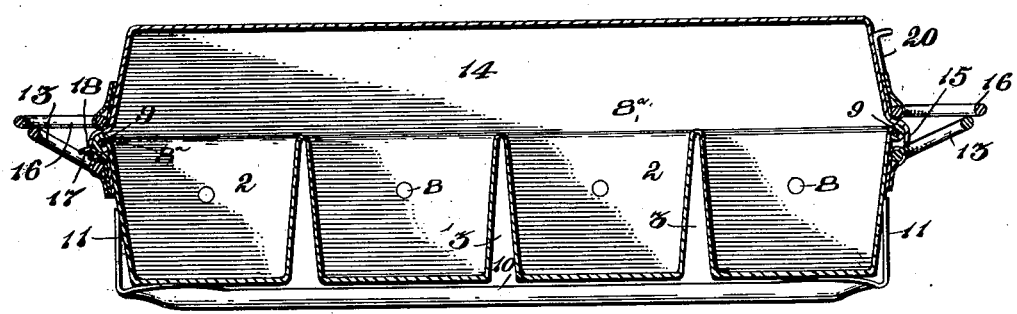
Figure 4:
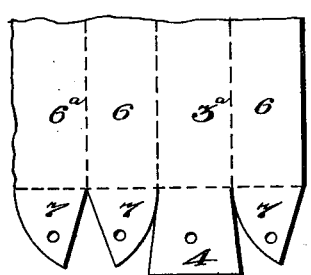
Figure 3:
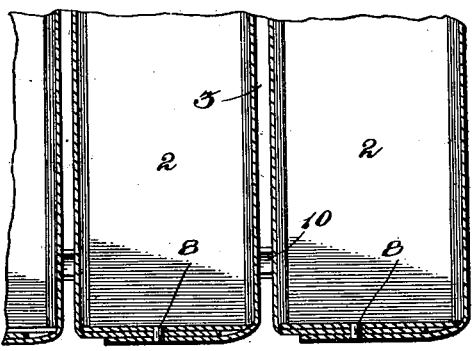

In the drawings, Figure 1 is a perspective view of a baking-pan constructed in accordance with the present invention. Fig. 2 is a longitudinal sectional view thereof. Fig. 3 is a horizontal sectional view taken through one corner of the pan. Fig. 4 is a plan view of a portion of the blank from which the pan is formed, and illustrated on a small scale.

Corresponding parts in the several figures of the drawings are designated by like characters of reference.

In the accompanying drawings, 1 designates the body of the improved pan, which is formed from a single blank of metal, so as to form a simple and inexpensive pan.

In order that a plurality of loaves of bread may be baked at one and the same time, the pan is provided with a plurality of sections or compartments 2 for the reception of the individual loaves, and between adjacent compartments there are provided intervening spaces 3, so that the hot air may circulate freely between the compartments to more effectually cook the bread.

As hereinbefore set forth, the body of the pan is formed from a single blank, a portion of which has been shown in Fig. 4, so as to illustrate the formation of one of the compartments. In Fig. 4 the several dotted lines indicate the direction of the different folds.

$3^a$ indicates the bottom of one of the compartments, the end of which is formed by the wing 4, which is bent upwardly at substantially right angles to the bottom 3 and has its outer edge 5 longer than the inner or lower edge thereof. The opposite side sections 6 are bent upwardly, so as to fit against the opposite edges of the wing or end 4, and by reason of the shape of the latter said sides flare upwardly and outwardly to facilitate the removal of the loaf which may be placed therein. The end of each side section 6 is provided with a wing 7, which is bent inwardly across the outer face of the wing or end 4, said wings 7 overlapping each other and the three wings substantially connected by means of a rivet 8 passing therethrough. It will be understood that the contiguous side section $6^a$ of the next adjacent compartment is bent downwardly, and by reason of the upward and outward flare of the sides of such compartments the latter are spaced apart, as hereinbefore set forth. As indicated in Fig. 2 and also by the broken-away portion of Fig. 1, the upper edge of the ends 4 of the respective compartments are formed into a bead $8^a$, through which is passed a marginal stiffening-wire 9, passing entirely around the pan and effectively bracing and connecting the several compartments.

As an additional strengthening means I provide the under side of the pan with cleats or strips 10, of substantially V shape in cross-section, said strips extending transversely across the compartments and having their opposite ends 11 flattened and bent up against the respective outer ends of the pan, to which they are secured by suitable rivets 12. These strips, furthermore, provide feet to space the bottom of the pan above the bottom of the oven, so as to permit a free circulation of hot air beneath the pan in addition to the circulation between the compartments thereof and also hold the pan out of contact with the heated bottom of the oven. At opposite ends of the pan there are provided suitable bail or ring handles 13 for conveniently handling the pan.

Removably fitted to the open upper side of the pan is a cover 14, having an outstanding marginal flange 15 resting upon the upper edges of the pan and supporting the cover thereon. Immediately above the pivoted or swinging handles 13 the cover is also provided with similar handles 16, which are adapted to be brought into contact with the adjacent handles 13, as indicated in Fig. 2, so that both pairs of handles may be grasped, and thereby prevent accidental displacement of the top during transportation of the pan.

At one end of the pan there is provided an outwardly-projecting tongue 17, preferably formed separate from the pan and secured thereto by means of the fastening device which secures the adjacent handle 13. This tongue is bowed or hooked at its outer end and is adapted to be passed loosely through a slot or opening 18, formed in the marginal flange of the cover, so as to hingedly connect the latter to the pan.

Located in one end of the cover and preferably opposite the hinged connection thereof there is provided a ventilating-opening 19, having a pivoted or swinging cover 20. This opening 19 is normally closed by the cover, so that the steam generated within the pan may not escape therefrom, and the opening is finally uncovered to permit of the escape of the collected steam when it is desired to brown the contents of the pan.

What I claim is—

A baking-pan, comprising a plurality of individual compartments, and formed from a single sheet of metal, which is folded at a plurality of points to form downwardly-divergent pairs of side sections, between which are interspaces that are open at their opposite ends, bottom sections between respective side sections and separated by the respective interspaces, end sections folded upwardly at opposite ends of the bottom sections and between the adjacent side sections, wings bent inwardly at the ends of the side sections and connected to the end sections, the upper edges of the end sections and the outer longitudinal sides of the opposite outer compartments being formed into beads, a strengthening and stiffening wire inclosed within the beads, and extending entirely around the pan, and opposite metal strips extending transversely across the bottoms of the several compartments, to form braces and feet therefor.

In testimony that I claim the foregoing as my own I have hereto affixed my signature in the presence of two witnesses.

JACOB F. MEREDITH.

Witnesses:
J. M. FARMER,
GEO. MARKLEY.